(12) United States Patent
Becattini et al.

(10) Patent No.: US 9,806,636 B2
(45) Date of Patent: Oct. 31, 2017

(54) DC/AC CONVERTER APPARATUS CONFIGURABLE AS GRID-CONNECTED OR STAND-ALONE AND POWER CONVERSION AND GENERATION SYSTEM COMPRISING SUCH DC/AC CONVERTER APPARATUS

(71) Applicant: ABB Technology AG, Zurich (CH)

(72) Inventors: Andrea Becattini, Cavriglia (IT); Sauro Macerini, Frazione Levane-Bucine (IT)

(73) Assignee: ABB SCHWEIZ AG (CH)

( * ) Notice: Subject to any disclaimer, the term of this patent is extended or adjusted under 35 U.S.C. 154(b) by 0 days.

(21) Appl. No.: 15/065,592

(22) Filed: Mar. 9, 2016

(65) Prior Publication Data

US 2016/0268926 A1   Sep. 15, 2016

(30) Foreign Application Priority Data

Mar. 10, 2015   (EP) .................................... 15158376

(51) Int. Cl.
*H02M 7/538* (2007.01)
*H02M 7/5387* (2007.01)
*H02J 3/38* (2006.01)

(52) U.S. Cl.
CPC ......... *H02M 7/53871* (2013.01); *H02J 3/383* (2013.01); *H02J 3/386* (2013.01); *Y02E 10/563* (2013.01)

(58) Field of Classification Search
CPC ............................ H02M 7/53871; H02J 3/383
See application file for complete search history.

(56) References Cited

U.S. PATENT DOCUMENTS

| | | | | |
|---|---|---|---|---|
| 9,300,171 | B2* | 3/2016 | Moth | H02J 9/062 |
| 2005/0105224 | A1 | 5/2005 | Nishi | |
| 2005/0105229 | A1* | 5/2005 | Deng | H02J 9/062 361/90 |
| 2011/0133552 | A1 | 6/2011 | Binder et al. | |
| 2012/0080942 | A1 | 4/2012 | Carralero et al. | |

(Continued)

OTHER PUBLICATIONS

European Search Report, EP15158376.2, ABB Technology AG, Sep. 21, 2015.

*Primary Examiner* — Emily P Pham
(74) *Attorney, Agent, or Firm* — Taft Stettinius & Hollister LLP

(57) ABSTRACT

A DC/AC converter apparatus comprising: input terminals to be connected to a DC power source; a DC/AC conversion unit configured to receive input DC electrical power via the input terminals and to convert the input DC electrical power into AC electrical power, the DC/AC conversion unit comprising two output terminals; two AC backup output terminals; a switch arrangement to selectively connect the two AC output terminals to the grid terminals and to the two AC backup output terminals; a control unit associated to the switch arrangement and configured to: drive the switches of the switch arrangement, sense when an AC voltage at the grid terminals is below a predetermined threshold; and automatically drive the switches of the switch arrangement to disconnect the two AC output terminals from the grid terminals and to connect the two AC output terminals to the two AC backup output terminals when the AC grid voltage is below a said predetermined threshold.

20 Claims, 1 Drawing Sheet

(56) References Cited

U.S. PATENT DOCUMENTS

2015/0022004 A1   1/2015   Okuda et al.
2016/0036235 A1* 2/2016   Getsla .................... H02J 3/383
                                                    307/80

* cited by examiner

DC/AC CONVERTER APPARATUS CONFIGURABLE AS GRID-CONNECTED OR STAND-ALONE AND POWER CONVERSION AND GENERATION SYSTEM COMPRISING SUCH DC/AC CONVERTER APPARATUS

TECHNICAL FIELD OF THE INVENTION

The present invention relates to a DC/AC converter apparatus and to a power conversion and generation system comprising such DC/AC converter apparatus, in particular, but not exclusively, the present invention relates to conversion systems of the electrical power generated by photovoltaic systems and adapted to be connected directly to the power grid.

STATE OF THE ART

The present invention relates to a DC/AC converter apparatus for connecting power conversion and generation systems to an AC grid or to one or more local loads.

The DC/AC converter apparatus comprises a plurality of switches, preferably relays, configured to provide full compliance to the norms and regulations concerning safety requirements for connecting and disconnecting power generation units to an AC grid, and means to switch the output of the DC/AC converter to an AC grid or to one or more local loads.

Power conversion and generation systems are adapted to generate electrical power for direct delivery to the power grid, in particular converting electrical power generated by renewable sources, such as, for instance, photovoltaic panels and wind turbines.

Furthermore, power conversion and generation systems usually comprise an inverter apparatus which is adapted to convert a DC input voltage into an AC output voltage characterized by amplitude and frequency as required by the power grid specifications. Said inverters are generally adapted to be connected directly to the power grid and typically comprise a semiconductor bridge circuit working as a DC-AC converter.

Grid-connected power generation units need to comply with safety standards and regulations to be certified safe to connect to the public power grid. In particular, grid-connected systems need to be safe against islanding, the condition in which the power generation unit continues to power a location even though electrical grid power from the electric utility is no longer present. Islanding can be dangerous to utility workers, who may not realize that a circuit is still powered, and it may prevent automatic re-connection of devices. For that reason, power generation units must be adapted to detect islanding conditions and immediately stop producing power. Power generation units need therefore to be provided with anti-islanding capabilities that force the disconnection of the output of the DC/AC converter from the AC mains in case the mains voltage is missing due to a failure. This requirement and others can be fulfilled if the power generation unit is connected to the grid via a suitable automatic switching circuit, preventing unintentional connection to a sub-grid or to a stand-alone grid and therefore preventing islanding conditions to happen.

State-of-the-art systems therefore offer the possibility to work in grid tied mode or stand-alone mode.

State-of-the-art systems are often equipped with an additional AC backup output adapted to provide a backup AC voltage in case, for instance, of a grid failure. When said AC backup output is in use, the DC/AC converter is disconnected from the grid, in islanding mode, and operates to convert the DC voltage input—connected to renewable energy sources or external batteries—into an AC voltage delivered to said AC backup output. The AC voltage at said AC backup output is present as long as the input DC power is enough for the DC/AC converter to operate correctly.

This operating mode is selected by the user through a manual transfer switch that connects alternatively the DC/AC converter output to the Grid or to said AC backup output. In some of the state-of-the-art systems this operating mode is always selectable, in some others state-of-the-art systems this operating mode is selectable only when an islanding condition is detected.

To switch from normal operation to AC backup output mode operation, the user normally needs to perform a few steps among which are: disconnecting the DC/AC converter output from the Grid, connecting the DC/AC converter output to said AC backup output and switch on the load connected to said AC backup output.

State-of-the-art systems require the user intervention to enable the AC backup output operation and are not adapted to operate automatically according to different grid operating conditions. Moreover, the AC backup output of said state-of-the-art systems is supplied only through external battery or renewable energy sources even if the grid AC voltage is present.

It is thus the object of the present invention to introduce a DC/AC converter apparatus which can be configured as grid-connected or stand-alone. This DC/AC converter apparatus is adapted to solve the technical problem described above and comprises a switch arrangement for automatically disconnecting the DC/AC converter output from the grid in case the grid AC voltage is below a predetermined threshold, e.g. it is null, and connecting said DC/AC converter output to the AC backup output, giving the user the advantage, among others, of powering critical loads during a black out without requiring external switching devices or the user's intervention.

Said switch arrangement preferably includes a plurality of switches, four of them being adapted to connect each AC terminal of the power generation unit to the grid via a first and a second series connected switching contact, two further switches being adapted to connect the AC grid terminals to the AC backup output terminals and one more switches being adapted to connect one of the output terminals of said DC/AC converter to the ground terminal.

Further features and advantages of the present invention will be apparent in the following description of a non-limitative embodiment with reference to the figures in the accompanying drawings, which are diagrammatic and show functional blocks which are adapted to be made according to different circuitry solutions in practice. In detail:

DETAILED DESCRIPTION OF THE INVENTION

Figure 1:
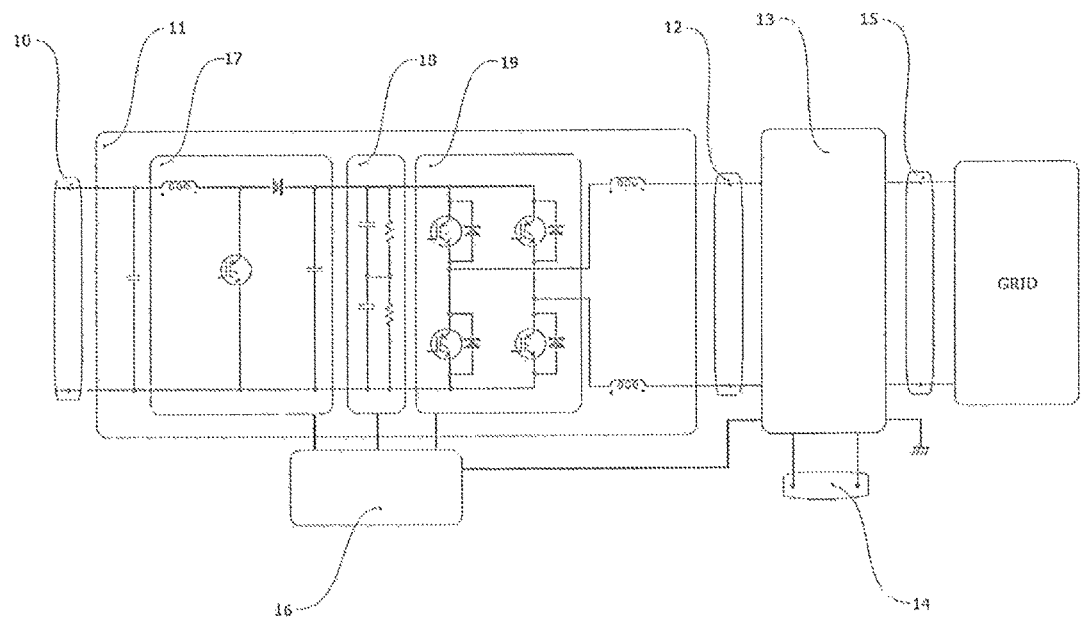
FIG. 1 shows a schematic diagram of a preferred embodiment of the DC/AC converter apparatus according to present invention.

A DC/AC converter apparatus according to a preferred embodiment of the present invention is depicted in enclosed FIG. 1, said DC/AC converter apparatus comprising:

input terminals 10 to be connected to a power generation unit such as a photovoltaic generator, a wind turbine generator or any other means to produce electrical power, and/or a battery unit;

a DC/AC conversion unit 11 adapted to receive input DC electrical power via the input terminals 10 and to convert the input DC electrical power into AC electrical power, said DC/AC conversion unit 11 comprising two AC output terminals 12;

two AC backup output terminals 14 which are preferably accessible to the user;

a switch arrangement 13 adapted to selectively connect the two AC output terminals 12 to the grid terminals 15 and to the two AC backup output terminals 14, the switch arrangement 13 being preferably further adapted to connect said two AC backup output terminals 14 to the grid terminals 15 and to connect one of the two AC output terminals 12 to the ground reference terminal 27;

a control unit 16 associated to the switch arrangement and adapted to drive the switches of such switch arrangement 13.

The control unit 16 associated to the switch arrangement is adapted to drive the switches of said switch arrangement 13 automatically, according to the detected operating conditions. Said control unit 16 can be further adapted to drive the switches of said switch arrangement 13 according to the manual settings and commands inputted by the user.

The control unit 16 is adapted to sense when the AC voltage at the grid terminals 15 has a value below a predetermined threshold. In this way, the control unit 16 is adapted to sense if the grid voltage has fallen at a null value or at another voltage value lower than the threshold, for example due to a grid failure.

The control unit 16 is further adapted to automatically drive the switches of the switch arrangement 13 in such a way to disconnect the two AC output terminals 12 from the grid terminals 15 and to connect the two AC output terminals 12 to the two AC backup output terminals 14 when the grid AC voltage is below the predetermined threshold.

Preferably, the control unit 16 is further adapted to sense if the grid voltage remains below the predetermined threshold for a predetermined time interval, and to automatically drive the switches in such a way to disconnect the two AC output terminals 12 from the grid terminals 15 and to connect the two AC output terminals 12 to the two AC backup output terminals 14 when the AC voltage grid is sensed to be below the predetermined threshold during the predetermined time interval, Preferably, the control unit 16 is further adapted to sense the presence of the DC power available at the input of said DC/AC conversion unit 11 and automatically drive the switches of said switch arrangement 13 in such a way to disconnect the output terminals 12 of the DC/AC converter 11 from the grid and to connect the two output terminals 12 to said AC backup output terminals 14 when the sensed grid AC voltage is below the threshold, preferably within the predetermined time interval, and the DC power is present at the inputs of the DC/AC conversion unit 11.

In this way, the output terminals 12 are connected to the backup output terminals 14 if there is the possibility of powering the loads associated to the backup output terminals 14 through the DC voltage present at the input of the DC/AC conversion unit 11. In general, the control unit 16 is adapted to drive said switch arrangement 13 according to three different operating modes:

a first operating mode where the grid voltage is present and above the predetermined threshold, the DC/AC converter output terminals 12 are connected to the grid, and the loads connected to said AC backup output terminals 14 are supplied from the grid AC voltage;

a second operating mode where an islanding condition occurred and the grid AC voltage is below the predetermined threshold, e.g. it is missing or at a low voltage level, and the DC/AC converter output terminals 12 are disconnected from the grid and connected to said AC backup output terminals 14;

a third operating mode where the grid voltage is present and above the predetermined threshold, the DC/AC converter output terminals 12 are disconnected from both said AC backup output terminals 14 and said grid terminals 15 and the loads connected to said AC backup output terminals 14 are supplied from the grid AC voltage.

In a preferred embodiment of the present invention said DC/AC conversion unit 11 preferably comprises an input booster converter 17 adapted to regulate and step-up the input DC voltage, a DC link capacitor bank 18 connected to the output of said input booster converter 17, and a full bridge inverter 19 comprising a plurality of electronic switches such as MOSFETs or IGBTs and adapted to convert the DC voltage of said DC link capacitor bank 18 into an AC output voltage compatible with the utility grid AC voltage.

According to a preferred embodiment, the switch arrangement 13 comprises a plurality of switches, preferably implemented by relays contacts, configured to provide the highest degree of safety and compliance to the norms and regulations concerning safety requirements for connecting and disconnecting power generation units to the grid. Due to the importance of the above cited safety requirements said switch arrangement must be robust and redundant, in order to be able to provide the requested emergency disconnection, and ensure the safety function, in the event of a single error.

Therefore said switch arrangement preferably comprises at least two serially connected and independently activated switches to connect/disconnect the DC/AC converter output terminals 12 to/from the grid terminals 15.

Figure 2:
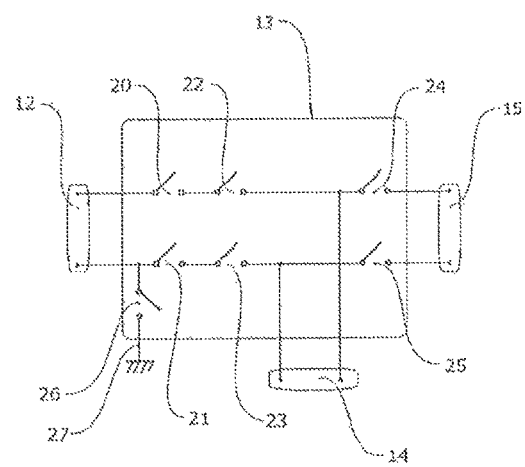
FIG. 2 shows a schematic diagram of a preferred embodiment of the interface connection device according to present invention.

With reference to the enclosed FIG. 2, a preferred embodiment of said switch arrangement 13 comprises:

a first switch 20 connected at a first end to the first of said DC/AC converter output terminals 12;

a second switch 22 connected at a first end to the second end of said first switch 20 and at a second end to the first of said AC backup output terminals 14;

a third switch 21 connected at a first end to the second of said DC/AC converter output terminals 12;

a fourth switch 23 connected at a first end to the second end of said third switch 21 and at a second end to the second of said AC backup output terminals 14;

a fifth switch 24 connected, at a first end, to the second end of said second switch 22 and to the first of said AC backup output terminals 14, and connected, at a second end, to the first of said grid terminals 15;

a sixth switch 25 connected, at a first end, to the second end of said fourth switch 23 and to the second of said AC backup output terminals 14, and connected, at a second end, to the second of said grid terminals 15;

a seventh switch 26 connected, at a first end, to the second of said DC/AC converter output terminals 12 and connected, at a second end to the ground terminal 27.

In said first operating mode, said seventh switch 26 is open and all the other switches are closed. In this operating mode the grid voltage is present, the DC/AC converter output terminals 12 are connected to the grid, and the loads connected to said AC backup output terminals 14 are supplied from the grid AC voltage.

In said second operating mode, said fifth switch 24 and said sixth switch 25 are open and all the other switches are closed. In this operating mode an islanding condition occurred, the grid AC voltage is below the predetermined threshold and the DC/AC converter output terminals 12 are disconnected from the grid and connected to said AC backup output terminals 14.

In said third operating mode, said fifth switch 24 and said sixth switch 25 are closed and all the other switches are open. In this operating mode the grid voltage is present, the DC/AC converter output terminals 12 are disconnected from both said AC backup output terminals 14 and said grid terminals 15 and the loads connected to said AC backup output terminals 14 are supplied from the grid AC voltage.

The described preferred embodiment of the present invention comprises at least two serially connected and independently activated switches to connect/disconnect the DC/AC converter output terminals 12 to/from the grid terminals 15 thus implementing robust and redundant disconnection means in case of emergency, adapted to guarantee safety operation in the event of a single error, thus complying with the most common safety standard.

Said switches may be advantageously implemented within single or multiple-pole relays allowing for cost and space saving topologies.

Said control unit 16 is adapted to check the actual status of each switch of said switch arrangement 13, the status of the grid and, preferably, the status of the DC power available at the input of said DC/AC conversion unit 11.

If the grid AC voltage is detected to be above the predetermined threshold, then said switch arrangement 13 is driven to a configuration adapted to connect the DC/AC converter output terminals 12 to the grid terminals 15 thus selecting said first operating mode.

If the grid AC voltage is below the predetermined threshold, preferably within a predetermined time interval, and an islanding condition is therefore detected, then said switch arrangement 13 is automatically driven to a configuration adapted to disconnect the DC/AC converter output terminals 12 from the grid terminals 15 thus selecting said second operating mode, wherein the available input DC power, provided by batteries or by renewable energy sources, is converted to provide AC power to the loads connected to said AC backup output terminals 14.

Said control unit 16 keeps on monitoring the grid and when the grid AC voltage is detected back, then said switch arrangement 13 is automatically driven to a configuration adapted to connect the DC/AC converter output terminals 12 to the grid terminals 15 thus selecting said first operating mode.

The invention claimed is:

1. A DC/AC converter apparatus comprising:
   input terminals to be connected to a DC power source;
   a DC/AC conversion unit configured to receive input DC electrical power via said input terminals and to convert said input DC electrical power into AC electrical power, said DC/AC conversion unit comprising two AC output terminals;
   two AC backup output terminals;
   a switch arrangement to selectively connect said two AC output terminals to the grid terminals and to said two AC backup output terminals;
   a control unit associated to said switch arrangement and configured to drive the switches of said switch arrangement, wherein said control unit is configured to sense when an AC voltage at said grid terminals is below a predetermined threshold, and to automatically drive the switches of said switch arrangement to disconnect said two AC output terminals from said grid terminals and to connect said two AC output terminals to said two AC backup output terminals when the AC voltage at said grid terminals is below said predetermined threshold.

2. The DC/AC converter apparatus according to claim 1 wherein said control unit is further configured to sense the presence of the DC power at said input terminals and to automatically drive the switches of said switch arrangement to disconnect said two AC output terminals from said grid terminals and to connect said two AC output terminals to said two AC backup output terminals when the AC voltage at said grid terminals is below said predetermined threshold and DC power is present at said input terminals.

3. The DC/AC converter apparatus according to claim 1, wherein:
   said DC/AC conversion unit further comprises a ground reference terminal and said switch arrangement is further configured to selectively connect said two AC backup output terminals to the grid terminals and to connect one of said two AC output terminals to said ground reference terminal; and
   said control unit is further configured to sense when the AC voltage at said grid terminals rises above said predetermined threshold and to automatically drive the switches of said switch arrangement in order to connect said two AC backup output terminals to the grid terminals when the AC voltage at said grid terminals rises above said predetermined threshold.

4. The DC/AC converter apparatus according to claim 1, wherein said control unit is further configured to drive the switches of said switch arrangement according to the user manual settings and commands.

5. The DC/AC converter apparatus according to claim 1, wherein said DC/AC conversion unit comprises an input booster converter to regulate and step-up the input DC voltage, a DC link capacitor bank, connected to the output of said input booster converter, and a full bridge inverter comprising a plurality of electronic switches and configured to convert the DC voltage of said DC link capacitor bank into an AC output voltage compatible with the utility grid AC voltage.

6. The DC/AC converter apparatus according to claim 1, wherein said switch arrangement comprises:
   a first switch connected, at a first end, to the first of said DC/AC converter output terminals;
   a second switch connected at a first end to the second end of said first switch and at a second end to the first of said AC backup output terminals;
   a third switch connected at a first end to the second of said DC/AC converter output terminals;
   a fourth switch connected at a first end to the second end of said third switch and at a second end to the second of said AC backup output terminals;
   a fifth switch connected, at a first end, to the second end of said second switch and to the first of said AC backup output terminals, and connected, at a second end, to the first of said grid terminals;
   a sixth switch connected, at a first end, to the second end of said fourth switch and to the second of said AC backup output terminals, and connected, at a second end, to the second of said grid terminals; and
   a seventh switch connected, at a first end, to the second of said DC/AC converter output terminals and connected, at a second end to the ground terminal.

7. The DC/AC converter apparatus according to claim 5, wherein said switch arrangement comprises a plurality of relays comprising said switches.

8. The DC/AC converter apparatus according to claim 1, wherein said DC power source is chosen in the group comprising a photovoltaic generator, a wind turbine generator or a battery unit.

9. A power conversion and generation system configured to produce and deliver AC power to a single phase AC grid comprising:
- a power generation unit for producing DC power; and
- a DC/AC converter apparatus comprising:
- input terminals to be connected to a DC power source;
- a DC/AC conversion unit configured to receive input DC electrical power via said input terminals and to convert said input DC electrical power into AC electrical power, said DC/AC conversion unit comprising two AC output terminals;
- two AC backup output terminals;
- a switch arrangement to selectively connect said two AC output terminals to the grid terminals and to said two AC backup output terminals;
- a control unit associated to said switch arrangement and configured to drive the switches of said switch arrangement, wherein said control unit is further configured to sense when an AC voltage at said grid terminals is below a predetermined threshold, and to automatically drive the switches of said switch arrangement to disconnect said two AC output terminals from said grid terminals and to connect said two AC output terminals to said two AC backup output terminals when the AC voltage at said grid terminals is below said predetermined threshold.

10. The power conversion and generation system according to claim 9, wherein said power generation unit is a photovoltaic power generation unit.

11. The DC/AC converter apparatus according to claim 2, wherein:
- said DC/AC conversion unit further comprises a ground reference terminal and said switch arrangement is further configured to selectively connect said two AC backup output terminals to the grid terminals and to connect one of said two AC output terminals to said ground reference terminal; and
- said control unit is further configured to sense when the AC voltage at said grid terminals rises above said predetermined threshold and to automatically drive the switches of said switch arrangement in order to connect said two AC backup output terminals to the grid terminals when the AC voltage at said grid terminals rises above said predetermined threshold.

12. The DC/AC converter apparatus according to claim 2, wherein said control unit is further configured to drive the switches of said switch arrangement according to the user manual settings and commands.

13. The DC/AC converter apparatus according to claim 3, wherein said control unit is further configured to drive the switches of said switch arrangement according to the user manual settings and commands.

14. The DC/AC converter apparatus according to claim 2, wherein said DC/AC conversion unit comprises an input booster converter configured to regulate and step-up the input DC voltage, a DC link capacitor bank connected to the output of said input booster converter, and a full bridge inverter comprising a plurality of electronic switches and configured to convert the DC voltage of said DC link capacitor bank into an AC output voltage compatible with the utility grid AC voltage.

15. The DC/AC converter apparatus according to claim 3, wherein said DC/AC conversion unit comprises an input booster converter configured to regulate and step-up the input DC voltage, a DC link capacitor bank connected to the output of said input booster converter, and a full bridge inverter comprising a plurality of electronic switches and configured to convert the DC voltage of said DC link capacitor bank into an AC output voltage compatible with the utility grid AC voltage.

16. The DC/AC converter apparatus according to claim 4, wherein said DC/AC conversion unit comprises an input booster converter configured to regulate and step-up the input DC voltage, a DC link capacitor bank connected to the output of said input booster converter, and a full bridge inverter comprising a plurality of electronic switches and configured to convert the DC voltage of said DC link capacitor bank into an AC output voltage compatible with the utility grid AC voltage.

17. The DC/AC converter apparatus according to claim 2, wherein said switch arrangement comprises:
- a first switch connected, at a first end, to the first of said DC/AC converter output terminals;
- a second switch connected at a first end to the second end of said first switch and at a second end to the first of said AC backup output terminals;
- a third switch connected at a first end to the second of said DC/AC converter output terminals;
- a fourth switch connected at a first end to the second end of said third switch and at a second end to the second of said AC backup output terminals;
- a fifth switch connected, at a first end, to the second end of said second switch and to the first of said AC backup output terminals, and connected, at a second end, to the first of said grid terminals;
- a sixth switch connected, at a first end, to the second end of said fourth switch and to the second of said AC backup output terminals, and connected, at a second end, to the second of said grid terminals; and
- a seventh switch connected, at a first end, to the second of said DC/AC converter output terminals and connected, at a second end to the ground terminal.

18. The DC/AC converter apparatus according to claim 2, wherein said DC power source is chosen in the group comprising a photovoltaic generator, a wind turbine generator or a battery unit.

19. The DC/AC converter apparatus according to claim 3, wherein said DC power source is chosen in the group comprising a photovoltaic generator, a wind turbine generator or a battery unit.

20. The DC/AC converter apparatus according to claim 14, wherein said switch arrangement comprises a plurality of relays comprising said switches.

* * * * *